Nov. 7, 1972    K. REDEKER    3,702,120
METHOD AND MEANS FOR IMPROVING AND INCREASING THE
RELIABILITY OF HYDRAULIC AND PNEUMATIC
MULTICIRCUIT CONTROL SYSTEMS
Filed June 10, 1971    3 Sheets-Sheet 1
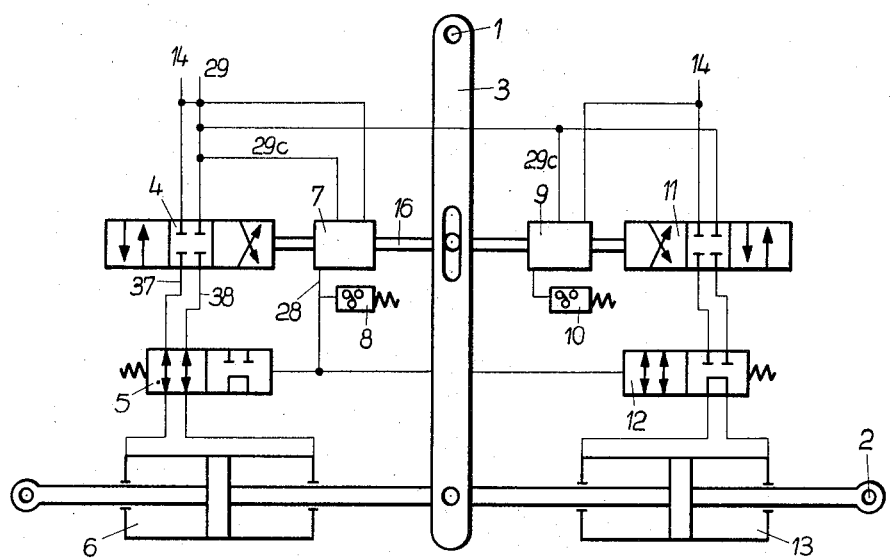
Fig.1
Fig.2
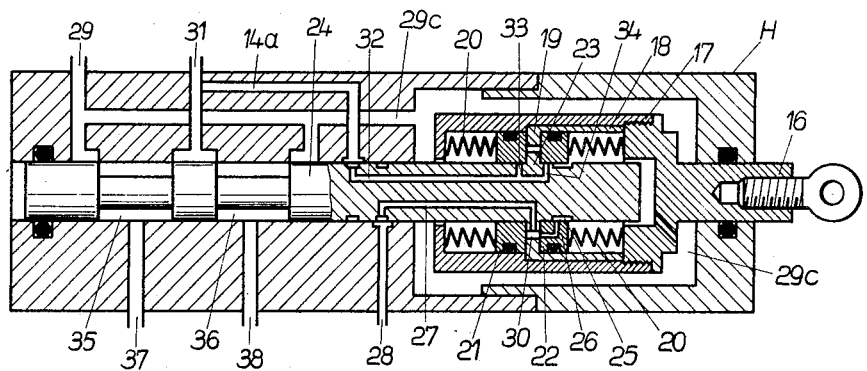
Inventor
KURT REDEKER

United States Patent Office 3,702,120
Patented Nov. 7, 1972

3,702,120
METHOD AND MEANS FOR IMPROVING AND INCREASING THE RELIABILITY OF HYDRAULIC AND PNEUMATIC MULTICIRCUIT CONTROL SYSTEMS
Kurt Redeker, Mainz, Germany assignor to Feinmechanische Werke Mainz G.m.b.H., Mainz am Rhine, Germany
Filed June 10, 1971, Ser. No. 151,772
Claims priority, application Germany, Sept. 5, 1970,
P 20 44 053.3
Int. Cl. F16k *11/10*
U.S. Cl. 137—1
11 Claims

ABSTRACT OF THE DISCLOSURE

The present invention relates to method and means for improving and increasing the reliability of hydraulic and pneumatic multicircuit control systems, in particular upon failure of a respective circuit in such systems, the input circuit when the system becomes inoperative, releasing signals for an uncoupling or disconnecting operation of the input circuit, and automatically effectuating a changeover to an auxiliary circuit system. The invention further relates to adjusting the drives operated by a fluid medium, e.g., acting on pistons, linear as well as rotary motors, which are actuated through control slide valve aggregates or units which are present at least in a dual arrangement. The duality includes dual energy supply, as well as double-acting signal circuit system, the operational elements thereof being used for the transformation of signals. The mechanical input signal and the feedback of the output signal are applied simultaneously and are substantially of the same magnitude with respect to the control slide valve aggregates arranged in multiple circuitries.

BACKGROUND OF THE INVENTION

Solutions to the aforesaid problems have become known where the pressure is effected by means of mechanical components, such as cams and the like. The disadvantages of these solutions reside in that (1) a complete disassembly becomes necessary for restoring the coupling of the input with the control valve unit upon freezing, jamming or like failure of the control valve system.
(2) either micro-switches and electro-hydraulic valves or complicated connection systems are required for the actuation of the necessary by-pass valves employed in such control systems.

Other mechanical solutions have become known, which can be restored to operation without disassembly. Their disadvantage, however, is that for establishing power of the fluid medium, excessive forces are continuously required for the input element, e.g., via a lever, or varying input forces are to be taken into consideration upon traversing or transgressing the frozen or jamming position.

SUMMARY OF THE INVENTION

The invention avoids the aforesaid and other disadvantages referred to and tends upon failure of a power circuit of the system of the aforesaid type to release latching output signals, when a jammed or failing control slide valve part is encountered in the case of mechanical input signals, without influencing permanent control superpressure forces, and without exerting any influence on control forces to be required for the further performance of the control system.

It is therefore one of the objects of the invention to provide means carrying out superpressures in such a way that when a control slide valve freezes or jams the movement of other control slide valves and the like can take place unhindered and unimpeded and a highly sensitive actuation of the control slide valves can take place, while a sensitive actuation of the control slide valves remaining still in the system or connected thereto, is always ensured.

It is another object of the invention to provide means effectuating the interruption of the connection from the input to the failing (e.g., jammed or frozen) control member, as well as the actuation of the by-pass valves through the use of the pressure medium of the system as an auxiliary energy source. The elimination of this interruption is brought about by switching off the auxiliary energy of the pressure medium.

According to a further object of the invention, provision is made by a device which is characterized principally in that within the forcing pressure aggregate included in the system pressure cycle, a mechanical input signal is created by an input member due to a temporary superpressure force under consideration of a deviation and utilization of the system pressure, so that a positive connection between the input member and a movable control slide element or part is continuously overcome and at the same time a connection between the system pressure cycle and the respective by-pass valve is established.

In such forcing pressure aggregate or block designed as a control slide valve, control rings under the resultant compressive force of spring means slits are opened and made accessible for the employment of auxiliary energy medium in a chamber with movable or displaceable chamber walls, so that upon the displacement of these chamber walls to increase the chamber volume, the positive connection between input member and control slide element or valve via collars and control rings is removed. Through connecting channel means auxiliary energy of the medium for the by-pass circuit becomes available in a duct or channel, while this uncoupled position will be maintained as long as the system medium pressure prevails through a medium feed channel, whereas in coupled position the chamber with its displaceable chamber walls will be connected through channels and a control slit with a return channel or duct for the medium.

The connecting channels between the system pressure feed channel or respectively between the channel to the by-pass valve and the chamber with displaceable chamber walls may be variously arranged, e.g., inside the piston body of the control slide valve or inside of concentric sleeve members rigidly connected with the input member.

The invention further contemplates a medium pressure block designed as a rotary slide valve, wings under the compressive action of spring means freeing channels or conduits which permit access of auxiliary energy derived from a compressive medium to a chamber with movable chamber walls, so that upon displacement of these chamber walls to effectuate an increase of the chamber volume, the elimination of the positive connection between an input member in the form of a rotatably displaceable input shaft and an output shaft with a firmly mounted rotary slide valve aggregate through webs or straps and wings becomes effective. However, through a connecting channel auxiliary energy mass for the by-pass circuit becomes then available in a channel. This uncoupled position being maintained after the pressure medium has become activated and as long as the system pressure prevails in a feed channel, whereas in the coupled position of the system the chamber with its movable chamber wall set establishes connection with a return channel via ducts and control slit means. These and other objects of the invention will become more clear and understandable, while the ensuing description of preferred embodiments of the invention progresses.

BRIEF DESCRIPTION OF THE DRAWINGS

The invention is explained and described with reference to two embodiments pursuant to the inventive concept.

FIG. 1 shows schematically a medium-operated control system embodying the invention.

FIG. 2 is a longitudinal section through a power block arrangement designed as control slide device represented in its coupled state.

DETAILED DESCRIPTION OF THE INVENTION

Figure 3:
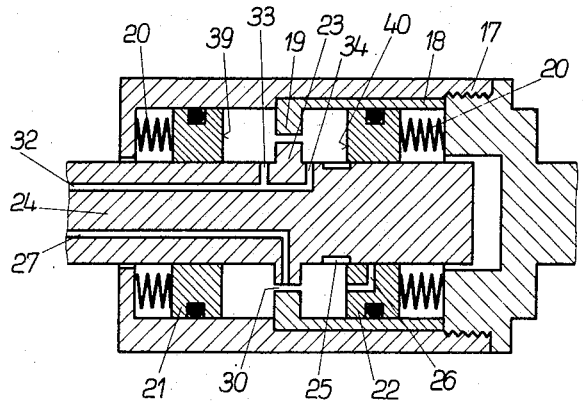
FIG. 3 is a detail of FIG. 2 shown in the uncoupled state and on an enlarged scale.

Referring now in greater detail to FIG. 1, there has been disclosed diagrammatically a multiple control system carried out in accordance with the invention. It is assumed that a mechanical input acts on pivot 1 of lever 3, the latter transmitting via coupling rod 16 movement to couplings shown diagrammatically as blocks 7 and 9, which in coupled condition act on the control slide valve units 4 and 11. The assembly of these valve units and their functions are known (see DIN 24,300 of March 1966, sheet 3, pages 4 and 5 of German Norms).

By way of these control slide valves 4 and 11, as well as on account of by-pass valves 5 and 12, the energy of a power fluid, e.g., hydraulic pressure medium, from line 14 influences double-acting linear motors 6 or 13 as a function of and according to the position of the by-pass valves 5 or 12. The output movement of piston rod 2 is fed back to connecting rod 16 via lever 3. In the normal position the control system including control slide valve unit 4, by-pass valve 5 and piston of motor 6 becomes operative as the control slide valve 4 is connected to connecting rod 16 by way of coupling 7, as depicted in FIG. 1.

Coupling 9 is also connected to the control slide valve unit 11 by way of connecting rod 16. During normal operation the hydraulic connection with the linear piston of motor 13 is suppressed by the action of the mentioned by-pass valve 12.

The piston of motor 13 can thus be moved freely by virtue of the action of the piston of linear motor 6.

When the control slide valve 4 freezes or jams coupling 7 will respond and at the same time a change-over (reversal) of the by-pass valves 5 and 12 must take place. Then the piston of motor 13 is readied for operation and the piston of motor 6 moves freely via connection with by-pass valve circuit 5. The failure of control slide system 4 in such case is indicated through a known pressure switch instrument 8.

If control valve 11 should fail before inoperativeness of control valve unit 4, such condition will likewise be indicated through appropriate pressure switch 10 known per se.

The invention relates essentially to the couplings or blocks 7 and 9 shown in FIG. 1 and their functional connection to the parts 5, 8, 10 and 12 of the control systems. Briefly stated, it eliminates the disadvantages hereinabove mentioned in that, for the interruption of the connection from the input to a frozen or jammed control slide unit, the system fluid pressure is employed as a source of auxiliary power and actuation of the by-pass valves 5 and 12 occurs through the use of such auxiliary power medium derived from the pressure medium of the system. Disassembly or dismantling for restarting the system after eliminating the jamming state of the control slide valves becomes not necessary, since on reduced pressure of the power medium the coupling between input and control slide unit occurs automatically. Upon occurrence of said jamming or freezing condition and after change-over has taken place, a highly sensitive actuation of the still connected control slide valve units is ensured.

Other structural details of the invention can be had from FIG. 2 which illustrates the basic principle of the instrumentalities with their essential features.

According to FIG. 2, the input member 16 acts through the collar sleeve 17 on the collar 19 of sleeve 18. By the force of springs 20 the control rings 21 and 22 are pressed against collars 19 and 23. Collar 19 is thus connected with collar 23 in a positive manner and without give or play. The movement of the input member 16 is thus transmitted directly to the control slide valve piston 24.

In coupled position channel 28 leading to the by-pass valves and/or the indicating instruments 8, 10 is connected with the return pipe 29 through channel 27, chamber 30 and channel 26, as well as via control slit 25.

Upon movement of the control slide valve piston 24, channel 37 or 38 can now be connected selectively with the return pipe 29 or with the system pressure line 31 via chamber 35 or 36, respectively.

When the control slide valve piston 24 freezes, a greater force becomes necessary briefly at the input member 16. If, for example, the input member 16 is pressed into the housing H, then counter to the force of spring 20 the control ring 21 is displaced to the left via collar 19. During this occurrence the connection of channel 33 with space 30 becomes established. Through channels 31 and 32 the system pressure thus prevails in or is communicated to space 30.

This latter pressure causes through the surfaces 39 and 40 (see FIG. 3) a displacement of the control rings 21 and 22 against the spring force. Thereby the coupling of collars 19 and 23 is released. The input member 16 can now be freely moved in relation to the control slide valve piston 24. Channel 26 is closed against the control slot 25. In channel or passage 28 the system pressure prevails through channel 27 and chamber 30. Through channel 28 an auxiliary energy is thus released for the changeover of the by-pass valves 5 and/or 12 and actuates under pressure the indicating elements (pressure switches) 8 and 10 according to FIG. 1. At the same time, through the pressure of the auxiliary energy of the flowing medium the control rings 21 and 22 remain held outwardly (FIG. 3) and against the forces of the springs 20, so that (1) the connection of channels 31, 32 and 33, 34 with chamber 30 and the continued communication via channels 27 to 28 remains effective (FIG. 3) and (2) the coupling of collars 19 and 23 remains in released condition.

After elimination of the piston jamming and upon lowering of the system pressure, the control rings 21 and 22 are automatically restored to their initial position by means of the force of spring means 20 and positive coupling becomes again effective.

Figure 4:
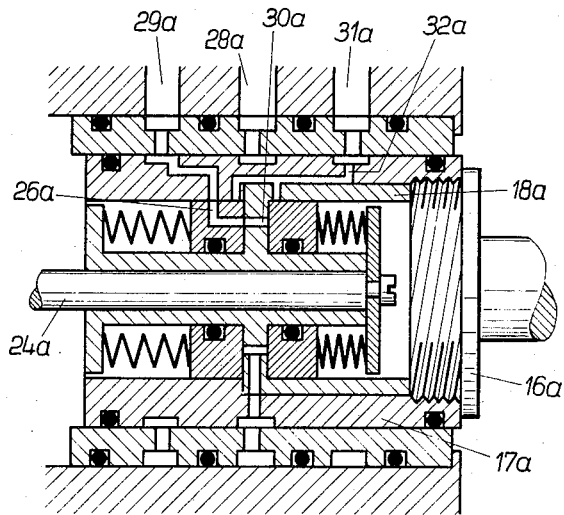
FIG 4 illustrates in a slightly modified form and on an enlarged scale another detail of FIGS. 2 and 3.

In the slight modification of the embodiment according to FIGS. 2 and 3, and illustrated in FIG. 4, there is disclosed principally only a different conduit line arrangement through various connecting channels similar to 32, 33, 34 and 27 of FIG. 3. In this embodiment said connecting passages or channels are arranged fixedly within concentric sleeves 17a, 18a and directly connected with the input member 16a.

Further parts, such as channels, passages and the like have received the same numerals with subletters "a" added, which parts have similar functions, as described in respect of corresponding parts of FIGS. 2 and 3.

Figure 5:
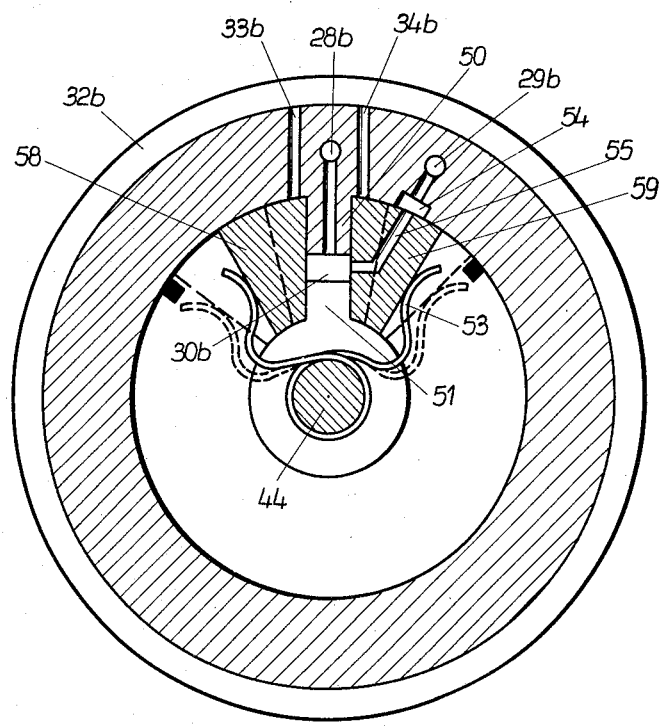
FIG. 5 depicts in diagrammatic side view and in cross section a modified embodiment pursuant to the invention in the form of a rotary slide arrangement.

FIG. 5 shows an embodiment of the invention incorporating a rotary control element in place of the linearly movable piston 24a of the previous embodiment. In this case also, jamming causes release of the mechanical connection of a connecting rod 44. This connection is provided by the cooperation of arm portions 50 and 51 with movable vanes 58 and 59 and a spring 53. A chamber 30b is normally connected by passages 29b, 55 and 54 to the pressure fluid return passage 28b, but this connection is interrupted by rotation of the connecting rod 44 relative to the output shaft connected to the rotary control element 52. The member 52 is only a connecting member. The pressure fluid thus passes by way of the passages 33b and 34b from passage 55 into the chamber 30b and there increases the volume of the chamber 30b so that the mechanical connection is interrupted as long as the pressure is maintained in the line and re-connection is effected when the pressure in the line 55 is reduced, while at the same time the pressure supplied to the by-pass valves by way of the output line is reduced by way of passage 28b.

In the device pursuant to FIG. 5, instead of a valve for controlling linear piston motions a valve performing rotational movements—similar to known rotational cylinder valves (see illustration 9.20 in the book Fluid Power Control, vol. 2, page 150, published by Krausskopf-Wiesbaden, 1962) is actuated, the rotational movement thereof being initiated for this valve by coupling member 52, while the input is transmitted by lever or rod 16 (FIG. 1) to shaft 44, whereby excess or auxiliary pressure causes a disconnection of the rotational movement about the central axis in such a manner that the coupling of shaft 44 with extension or arm 51 via wings 58, 59 through action of spring 53 to arm 52 and arm 50 is neutralized, as soon as upon blocking of the rotary valve motion by way of arm 51 wing 58 or 59 will be forced with respect to arm 50 in such a manner that auxiliary power medium from passage 32b via passageway 33b or 34b is conducted into chamber 30b, so that this chamber, as indicated in dotted lines, will be expanded or enlarged, while simultaneously closing or blocking of passageway 55 occurs with respect to return conduit 29b and slot 54, so that part 51 and arm or web 50 become disconnected and the auxiliary pressure medium in passageway 28b will be directed to selected valve units of FIG. 1. In the starting stage passageway 28b will be connected via chamber 30b, conduit 55, slot 54 to return conduit 29b, so that the state of disconnection by means of the auxiliary power medium will be maintained only until jamming motion is overcome. The action of the auxiliary power medium is then interrupted or cut off, so that simultaneously passageway 28b becomes again connected to return conduit 29b.

The invention in its broader aspects is not limited to the specific mechanism shown and described but departures may be made therefrom within the scope of the attached claims without departing from the principles of the invention and without sacrificing its chief advantages.

What is claimed is:

1. The method of increasing the reliability of hydraulic and pneumatic fluid-actuated multicircuit control systems upon failure of one of the systems; characterized by the steps of forcing the input circuit of the one system and simultaneously releasing signals for uncoupling the input circuit to change-over to another system upon automatically interrupting the connection from the input circuit to the one system and its failing control means, and conditioning by-pass valve means in said systems by means of the fluid pressure to work via said by-pass valve means as auxiliary pressure force in the other system.

2. Means for increasing the reliability of multicircuit control systems actuatable by a pressure medium, characterized in that control slide valve units (7, 9) are contained in said pressure medium control system, an input member (16) adapted to release a mechanical input signal through said pressure medium, which disrupts a positive connection (19–23; 50, 51, 53, 58, 59) between said input member and a movable control slide valve unit (24, 44) via deviating passageways (32, 33, 30; 33b, 34b, 30b) provided in said control slide valve unit, thereby to utilize the pressure medium (39, 40) and simultaneously establishing a connection between the pressure medium and said by-pass valves (5, 12) forming parts of said control systems.

3. Means according to claim 2, characterized in that said control slide valve unit (FIGS. 2 to 4) is equipped with spring-supported control rings (21, 22), said rings being cooperable with slots (33, 34) to permit access of auxiliary pressure medium to a chamber (30, 30a, 30b) provided with displaceable walls for increasing the normal volume of said chamber, whereby an increase of the chamber volume effectuates a positive connection between said input member (16) and a piston (24) movable in said control slide valve unit via displaceable collars (19, 23), which upon displacement thereof cause said auxiliary pressure medium via a channel (27) to become available for the circuit part containing said by-pass valves thereby to effectuate uncoupled condition, which is maintained as long as the pressure of the medium prevails in a feed channel (31), whereas in coupled position said chamber (30) is connected through channels (27, 28) and slot (25) with a return channel (29) to deliver said medium back to said systems.

4. Means according to claim 3, wherein said connecting channels (32, 33, 34; 27) are arranged between a feed channel (31) for the pressure medium to said by-pass valves and said chamber (30).

5. Means according to claim 2, including concentric control sleeves (17, 18) directly connected with said input member (16).

6. A system according to claim 5, wherein connecting passages for supplying pressure fluid between an inlet pressure fluid passage and a passage to the associated by-pass valve and said chamber are arranged within the control piston of said control element.

7. A system according to claim 5, wherein connecting passages for supplying pressure fluid between an inlet pressure fluid passage to the associated by-pass valve and said chamber are arranged within concentric sleeves.

8. A system according to claim 5, wherein said control elements are rotary pistons, and said mechanical couplings each comprising a pair of vanes which are acted upon by spring pressure, movement of said vanes against the spring pressure permitting pressure fluid to pass into a chamber with movable chamber walls formed by respective opposite surfaces of said vanes, so that by displacement of said vane walls in a direction of an increase in the volume of the chamber the mechanical connection between a rotary input member and an output shaft fixedly connected to the associated rotary piston by means of arm portions (50, 51) normally held between the vanes is released and pressure fluid is supplied to the associated by-pass valve, the mechanical connection remaining released while the pressure of the system fluid is maintained, but is reconnected on removal of said pressure.

9. A hydraulic, pneumatic and like fluid-actuated control system comprising two control circuits, and means to change over from one control circuit to the other in the event of failure of one of said control circuits, said means including two mechanical couplings whereby control movements are transmitted to respective control elements forming parts of said control circuits, and two by-pass valves associated respectively with said control circuits, resistance to movement of one control element of one of said control circuits causing system pressure to disengage the mechanical coupling transmitting said movement to said control element, but to operate the by-pass valves whereby said control circuit change-over occurs.

10. A system according to claim 9, wherein said control elements are linearly movable motor pistons, and said mechanical couplings each comprising a passageway which is opened by control rings normally acted under spring pressure, said passageway permitting pressure fluid to pass into a chamber provided with movable chamber walls formed by surfaces of said control rings, so that by displacement of said walls in a direction to increase the volume of the chamber, the mechanical connection between said input member and the control piston by means of collars normally held between the control rings is released and pressure fluid is supplied to the associated by-pass valve, the mechanical connection remaining released while the pressure of the system fluid is maintained, but is reconnected on removal of said pressure.

11. A method of changing from one control circuit to another control circuit in the event of the failure of one of said control circuits in a hydraulic, pneumatic and like fluid system, in which resistance to movement of one control element in said one control circuit causes the system pressure fluid to automatically disengage a mechanical coupling transmitting said movement to said control element and to operate by-pass valves whereby a change-over occurs.

References Cited

UNITED STATES PATENTS 3,253,613   5/1966   Richolt _____ 137—596

HENRY T. KLINKSIEK, Primary Examiner

U.S. Cl. X.R.

137—596